US007501476B2

(12) United States Patent
Stokes et al.

(10) Patent No.: US 7,501,476 B2

(45) Date of Patent: Mar. 10, 2009

(54) METHOD FOR PREPARING POLYOLEFINS CONTAINING VINYLIDENE END GROUPS USING AZOLE COMPOUNDS

(75) Inventors: Casey D. Stokes, Novato, CA (US); Robson F. Storey, Hattiesburg, MS (US)

(73) Assignees: Chevron Oronite Company, LLC, San Ramon, CA (US); The University of Southern Mississippi, Hattiesburg, MS (US)

( * ) Notice: Subject to any disclaimer, the term of this patent is extended or adjusted under 35 U.S.C. 154(b) by 364 days.

(21) Appl. No.: 11/356,491

(22) Filed: Feb. 16, 2006

(65) Prior Publication Data

US 2007/0155908 A1 Jul. 5, 2007

Related U.S. Application Data

(60) Provisional application No. 60/755,552, filed on Dec. 30, 2005.

(51) Int. Cl.
*C08C 19/22* (2006.01)
*C08F 8/32* (2006.01)

(52) U.S. Cl. .................... 525/375; 525/379; 525/333.7; 525/530; 525/269; 525/270; 525/268; 525/298; 525/343; 525/349; 525/242

(58) Field of Classification Search ................. 525/242, 525/375, 379, 333.7, 530, 269, 270, 268, 525/298, 343, 349

See application file for complete search history.

(56) References Cited

U.S. PATENT DOCUMENTS

| | | | | |
|---|---|---|---|---|
| 4,152,499 | A | 5/1979 | Boerzel et al. | |
| 4,255,538 | A * | 3/1981 | Skillicorn | 528/376 |
| 4,342,849 | A | 8/1982 | Kennedy | |
| 4,393,199 | A | 7/1983 | Manser | |
| 4,468,291 | A | 8/1984 | Naarmann et al. | |
| 4,758,631 | A | 7/1988 | Kennedy et al. | |
| 4,910,321 | A | 3/1990 | Kennedy et al. | |
| 4,929,683 | A | 5/1990 | Kennedy et al. | |
| 5,066,730 | A | 11/1991 | Kennedy et al. | |
| 5,122,572 | A | 6/1992 | Kennedy et al. | |
| 5,219,948 | A | 6/1993 | Storey et al. | |
| 5,366,745 | A | 11/1994 | Daden | |
| 5,428,111 | A | 6/1995 | Faust et al. | |
| 5,464,549 | A * | 11/1995 | Sieberth | 508/232 |
| 5,488,000 | A | 1/1996 | Zhang et al. | |
| 5,637,647 | A | 6/1997 | Faust | |
| 5,677,386 | A | 10/1997 | Faust | |
| 6,468,948 | B1 * | 10/2002 | Rossi et al. | 508/591 |
| 6,969,744 | B2 | 11/2005 | Stokes et al. | |
| 2004/0015029 | A1 | 1/2004 | Lange et al. | |
| 2004/0260033 | A1 * | 12/2004 | Stokes et al. | 525/375 |
| 2005/0282972 | A1 * | 12/2005 | Stokes et al. | 525/375 |
| 2007/0155910 | A1 * | 7/2007 | Stokes | 525/333.7 |
| 2007/0155911 | A1 * | 7/2007 | Stokes et al. | 525/333.7 |

FOREIGN PATENT DOCUMENTS

| | | |
|---|---|---|
| EP | 0 341 012 B1 | 12/1992 |
| GB | 2 184 738 A | 7/1987 |
| WO | WO 99/09074 | 2/1999 |

OTHER PUBLICATIONS

Diaz et al., Electrochemical Polymerization of Pyrrole, J. Chem. Soc. Chem. Commun., 1979, pp. 635-636, Royal Society of Chemistry.

Diaz et al., A Polymer Electrode with Variable Conductivity: Polypyrrole, J. Chem. Soc. Chem. Commun., 1980, pp. 397-398, Royal Society of Chemistry.

Zinger et al., Timed Release of Chemicals from Polypyrrole Films, J. American Chemical Society, 1984, pp. 6861-6863, vol. 106, No. 22, American Chemical Society.

Roth et al., A Novel Method for the Determination of Propagation Rate Constants: Carbocationic Oligomerization of Isobutylene, Macromolecules, 1996, pp. 6104-6109, vol. 29, No. 19, J. American Chemical Society.

Bae et al., β-Proton Elimination by Free Bases in the Living Carbocationic Polymerization of Isobutylene, Macromolecules, 1997, pp. 7341-7344, vol. 30, No. 23, J. American Chemical Society.

Nielsen et al., Synthesis of isobutenyl-telechelic polyisobutylene by functionalization with isobutenyltrimethylsilane, Polymer, 1997, pp. 2529-2534, vol. 38, No. 10, Elsevier Science Ltd.

Gardini, The Oxidation of Monocyclic Pyrroles, Adv. Heterocyl. Chem., 1973, pp. 67-99, vol. 15, No. 67.

* cited by examiner

*Primary Examiner*—Douglas Mc Ginty

(74) *Attorney, Agent, or Firm*—Joseph P. Foley; Claude J. Caroli

(57) ABSTRACT

Disclosed is a method for preparing polyolefins containing vinylidine end groups from quasiliving carbocationically terminated polyolefin polymers by contacting the quasiliving carbocationically terminated polymer with a suitable azole quenching agent and substituted derivatives thereof.

34 Claims, No Drawings

METHOD FOR PREPARING POLYOLEFINS CONTAINING VINYLIDENE END GROUPS USING AZOLE COMPOUNDS

FIELD OF THE INVENTION

The present invention is directed to a method for preparing polyolefins having enriched vinylidene end groups. More particularly, the present invention is directed to preparing polyolefins containing vinyldene end groups from quasiliving carbocationically terminated polyolefin polymers by contacting the quasiliving carbocationically terminated polymer with quenching agent selected from suitable azole compounds and substituted derivatives thereof.

BACKGROUND OF THE INVENTION

Linear polyolefins made using a mono-functional initiator containing a single "exo-olefin", "1,1-di-substituted" olefin, or "methylvinylidene," end group are useful precursors for the preparation of polymers containing specific functional end groups. Polymers made using multi-functional initiators would have multiple exo-olefinic end groups. Polymers containing specific end groups are useful as lubricating oil additives. One example of a functionalized polymer containing hetero atoms is polyisobutenylsuccinic anhydride, which is produced by reaction of olefin terminated polyisobutylene with maleic anhydride. Functional end groups may also be desirable for synthesizing polymers capable of undergoing further reaction.

Conventional ionic polymerizations can be anionic or cationic. Anionic polymerizations proceed, in the presence of a base, through carbanions and favor monomers having electron withdrawing groups. Cationic polymerizations proceed, in the presence of an acid, through a carbocation, also called a carbenium ion, and favor monomers that have electron releasing groups.

Similarly to the conventional polymerization systems, living polymerization systems may be either anionic or cationic. The difference between conventional polymerizations and living polymerizations is that an ideal living polymerization proceeds in the absence of chain transfer and chain termination. Living polymerization systems are of great commercial importance because the degree of polymerization may be controlled by controlling the feed ratio of monomer to initiator and sequential addition of two or more different monomers affords the ability to produce block copolymers. Polymerization continues until the monomer is exhausted, but the polymers retain their ability to add additional monomers any time in the future. A number of such systems are well known in the art.

A further development is the cationic quasi-living polymerization systems using conventional monomers. Quasi-living polymerization is best achieved when certain conditions are employed, for example anhydrous reagents. Cationic quasi-living polymerizations differ from truly living polymerizations in that, although the rate of chain transfer approaches zero, chain termination is present but reversible. One important example of a cationic quasi-living polymerization is the cationic quasi-living polymerization of isobutylene.

Typically, cationic quasi-living polymerizations of isobutylene yield narrow molecular weight distribution and one major polymer product containing the 2-chloro-2-methylpropyl end group, also referred to as the "tert-chloride" end group. Under certain conditions minor amounts of olefinic isomers may also be produced. On the other hand, there are two major olefinic isomers produced during conventional polymerization of isobutylene with $BF_3$. The highly reactive exo-olefin isomer is the most abundant and the relatively unreactive 2-methyl-1-propenyl isomer is also produced. The 2-methyl-1-propenyl isomer is also referred to as the "tri-substituted" isomer or "endo olefin" isomer. Furthermore, conventional polymerization of isobutylene yield polymers with broader molecular weight distributions or polydispersity indices than typical quasiliving polymerizations.

Exclusive production of the exo-olefin isomer has not been previously achieved under conventional polymerization conditions.

There are two established methods for producing polyisobutylene containing only the exo-olefin end group. One method involves chemical dehydrohalogenation of tert-chloride terminated polyisobutylene using potassium tert-butoxide in a post polymerization reaction (U.S. Pat. No. 4,342,849). The other method involves in situ quenching of quasiliving isobutylene with methallyltrimethylsilane, which converts an active, living carbenium ion to the exo-olefin end group. See for example, Roth and H. Mayr, *Macromolecules*, 29, 6104, 1996; and Nielsen, L. V.; Nielsen, R. R.; Gao, B.; Kops, J.; Ivan, B. *Polymer* 1997, 38(10), 2529.

Polyisobutylene polymers containing more than one exo-olefin end group may be prepared using the above methods by the use of a multi-functional initiator. The preparation of polyolefins, including polyisobutylene polymers, is well known in the art. A number of patents have discussed processes for making polyisobutylene polymers containing exo-olefin end groups, but none using quenching a cationic quasiliving polymerization system with the substituted azole compounds of the present invention.

SUMMARY

The present invention is directed in part to a method for preparing polyolefins containing vinylidene end groups; this method comprises:

a. providing a quasiliving carbocationically terminated polyolefin polymer,
b. contacting the polymer in step a) with a substituted azole quenching agent compound according to Formula I:

Formula I

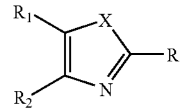

wherein:

$R_1$ and $R_2$ are independently hydrogen, alkyl from 1 to 20 carbon atoms, cycloalkyl from about 3 to about 7 carbon atoms, aryl from 6 to about 20 carbon atoms, alkaryl from about 7 to 30 carbon atoms, aralkyl from about 7 to 30 atoms; or $R_1$ and $R_2$ together form a fused aromatic ring having from 6 to 10 carbon atoms which may be unsubstituted or substituted with 1 to 4 substituents selected independently from alkyl of one carbon atom to about 20 carbon atoms, cycloalkyl of about 3 to about 7 carbon atoms, aryl of about 6 to about 30 carbon atoms, alkaryl of about 7 to about 30 carbon atoms, aralkyl of about 7 to about 30 carbon atoms, alkoxy of about 1 to 6 carbon atoms, alkylthioether of about 1 to 6 carbon atoms, halo, or amino of the formula —NR*R**, where R* and R** are independently alkyl from about 4 to 10 carbon atoms, cycloalkyl of about 4 to about 7 carbon atoms, aryl of about 6 to about 10 carbon atoms, alkaryl of about 7 to about 10 carbon atoms, aralkyl of about 7 to about 10 carbon atoms;

R is hydrogen, alkyl from 1 to 20 carbon atoms, cycloalkyl from about 3 to 7 carbon atoms, aryl from 6 to about 20 carbon atoms, alkaryl from about 7 to 30 carbon atoms, aralkyl from about 7 to 30 atoms, with the proviso that when R is hydrogen, than $R_2$ is branched alkyl having at least three carbon atoms, aryl, cycloalkyl, alkaryl, or aralkyl, and with the further proviso that when R is methyl then $R_1$ and $R_2$ are independently selected from alkyl from 1 to 20 carbon atoms, cycloalkyl from about 3 to about 7 carbon atoms, aryl from 6 to about 20 carbon atoms, alkaryl from about 7 to 30 carbon atoms, aralkyl from about 7 to 30 atoms; and X is oxygen or sulfur.

The contacting step is conducted under suitable conditions to enable the quenching agent to interact with the reactive chain end of the polyolefin and facilitate the removal of a proton from the reactive chain end, thereby forming the vinylidene end group. Thus, selecting suitable quenching reaction system conditions (temperature, Lewis Acid, solvent) can optimize conversion to the desired vinylidene terminated polymer. Prefereably, conversion is greater that 10 mole %, more preferably 25 mole %, more preferably 50 mole %, even more preferably 75 to 90 mole % and even up to 100 mole % when compared to a control at the same conditions in the absence of a quenching agent.

In the compound of Formula I, one of $R_1$ or $R_2$ can be hydrogen, but preferably, $R_1$ is selected to be hydrogen. A degree of steric hindrance around the nitrogen heteroatom is generally desirable thus it is preferred that when R is hydrogen that $R_2$ is a branched alkyl having at least three carbon atoms, isopropyl, isobutyl, sec-butyl, tert-butyl and the like.

In one aspect, $R_1$ and $R_2$ together form a fused aromatic ring having from 6 to 10 carbon atoms which is substituted with 1 to 4 substituents selected independently from alkyl of one carbon atom to about 10 carbon atoms, cycloalkyl of about 3 to about 7 carbon atoms, aryl of about 6 to about 10 carbon atoms, alkaryl of about 7 to about 10 carbon atoms, aralkyl of about 7 to about 10 carbon atoms. In another aspect, at least one $R_1$ and $R_2$ are alkyl, and preferably both are alkyl. In the above, X is selected to be oxygen, and in another aspect, X is sulfur.

In another, aspect R is alkyl from 2 to 20 carbon atoms, cycloalkyl from about 3 to 7 carbon atoms, aryl from 6 to about 20 carbon atoms, alkaryl from about 7 to 30 carbon atoms, aralkyl from about 7 to 30 atoms.

Another aspect of the present invention is directed to a method for producing a vinylidene terminated polymer comprising a) providing a quasiliving carbocationically terminated polyolefin polymer and contacting the polymer in step a) with a azole quenching agent compound according to Formula II:

Formula II

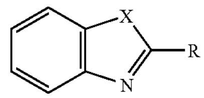

wherein

R is alkyl from 2 to 20 carbon atoms, aryl from 6 to about 20 carbon atoms, alkaryl from about 7 to 30 carbon atoms, or aralkyl from about 7 to 30 atoms; and X is oxygen or sulfur.

In the compound according to Formula II, particularly preferred R is aryl, alkaryl or aralkyl, with 2-phenylbenzoxazole or 2-phenylbenzothiazole being particularly preferred.

The quasiliving carbocationically terminated polymer can be formed by contacting at least one cationically polymerizable olefin monomer with an initiator, in the presence of a Lewis acid and solvent under suitable quasiliving polymerization reaction conditions and thereafter adding the quenching agent. This type of reaction allows for in-situ formation of the final vinylidene containing polyolefin. Other suitable quasiliving carbocationically terminated polyolefin polymers can be formed by ionizing a polyolefin chain end, commonly halides, in the presence of a Lewis acid and a solvent under suitable quasiliving polymerization reaction conditions.

The initiators may be monofuncitonal, bifunctional or multifunctional and various olefin monomers can be employed.

Another aspect is directed to a method for producing a vinylidene terminated polymer comprising: providing a quasiliving carbocationically terminated polyolefin polymer contacting that polymer with a substituted azole quenching agent of the compound according to Formula I:

Formula I

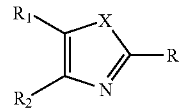

wherein:

$R_1$ and $R_2$ are independently alkyl from 1 to 20 carbon atoms, aryl from 6 to about 20 carbon atoms, alkaryl from about 7 to 30 carbon atoms, aralkyl from about 7 to 30 atoms; or $R_1$ and $R_2$ together form a fused aromatic ring having from 6 to 10 carbon atoms;

R is alkyl from 2 to 20 carbon atoms, aryl from 6 to about 20 carbon atoms, alkaryl from about 7 to 30 carbon atoms, aralkyl from about 7 to 30 atoms; and X is oxygen or sulfur.

In another aspect, the quasiliving polymerization system is so controlled so that the vinylidene terminated polymer has a molecular weight distribution, $M_w/M_n$, from about 1.01 to about 3.0, more preferably from about 1.1 to about 2.0 and even more preferably less than 1.5.

DETAILED DESCRIPTION

Definitions

As used herein, the following terms have the following meanings unless expressly stated to the contrary:

The term "alkyl" as used herein refers to straight chain and branched chain saturated aliphatic groups typically having from one carbon atom to about 20 carbons atoms. Some examples of straight chain and branched chain saturated aliphatic groups are methyl, ethyl, propyl, butyl, isopropyl, isobutyl, sec-butyl, tert-butyl, and the like. The term "branched alkyl" as used herein refers to an alkyl group in which the carbon atom representing the point of attachment of the group to the rest of the molecule is either a tertiary or quaternary carbon atom. The term "tertiary carbon" as used herein refers to a carbon atom that is attached to three other carbon atoms. The term "quaternary carbon" as used herein refers to a carbon atom that is attached to 4 other carbon atoms.

The terms "carbenium ion" or "carbocation" as used herein refer to a positively charged carbon atom bearing three $sp^2$-bonded substituents and an empty p orbital.

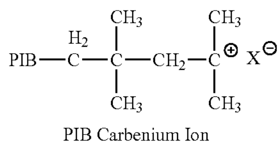

PIB Carbenium Ion

The term "chain transfer" as used herein refers to the cessation of growth of one polymerization chain with the possible initiation of another polymerization chain.

The term "common ion salt" as used herein refers to an ionic salt that is optionally added to a quasi-living cationic polymerization mixture to prevent dissociation of the propagating carbenium ion and counter-ion pairs. The anion of the common ion salt is identical to the counter-ions of the propagating chain ends. The cation of the common ion salt is typically a fatty quaternary ammonium cation, such as tetra-n-butyl ammonium ion, which confers solubility in the organic media.

The term "common ion salt precursor" as used herein refers to an ionic salt, optionally added to a quasi-living cationic polymerization mixture, which generates counter-anions that are identical to those of the propagating chain ends, via in situ reaction with the Lewis acid. An example is tetra-n-butylammonium chloride.

The term "controlled molecular weight distribution" as used herein refers to polyolefin polymers having a desired molecular weight distribution. The molecular weight distribution or polydispersity index (PDI) herein is calculated by dividing the average molecular weight of the polymer chains by the number average molecular weight, $M_w/M_n$.

The term "coupling" as used herein refers to the addition of a polymer terminal carbenium to a polymer exo-olefin chain end, for example when the polymer is polyisobutylene then this refers to the addition of a polyisobutylene terminal carbenium ion to a polyisobutylene olefin chain end.

The term "coupled product" as used herein refers to the product of addition of a polymer (terminal carbenium) ion to a polymer (exo-olefin) chain end. Coupled product has a number average molecular weight that is approximately twice that of the main polymer product.

The term "conventional polymerization" as used herein refers to polymerization wherein the chain-reaction polymerization involving olefins proceeds with ions as chain carrying particles, either anions or cations. Polymerization proceeds through the steps of chain initiation, chain propogation, chain transfer and chain termination.

The term "di-EAS product" as used herein refers to the product which results when two separate polymer terminal carbenium ions react to form a covalent bond with a single quenching agent molecule. Di-EAS product contains in its structure a residue from the quenching agent.

The terms "di-substituted olefin" or "exo-olefin" or "methyl vinylidene" as used herein refer to an olefin polymer chain containing an exo-olefin chain end, for polyisobutylene the structure is as shown below.

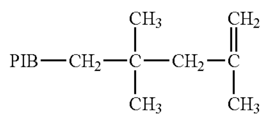

The term "EAS product" as used herein refers to the product which results when one polymer terminal carbenium ion reacts to form a covalent bond with a single quenching agent molecule. EAS product contains in its structure a residue from the quenching agent.

The term "electron donor" as used herein refers to a basic and/or nucleophilic substance added to the polymerization reaction that is either fully complexed with the Lewis acid or fully non-complexed with the Lewis acid. The concentration of electron donor exceeds the concentration of the protic impurities, for example water.

The term "electrophilic aromatic substitution or EAS" as used herein refers to the process by which the EAS product is produced.

The term "gem-dimethyl carbons" as used herein refers to the two methyl carbons alpha to the carbenium ion or the chloride bonded carbon of the polyolefin polymer chain end as depicted in the structure below.

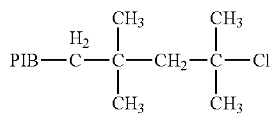

PIB tert-Chloride

The term "hydrocarbyl" refers to an organic radical primarily composed of carbon and hydrogen which may be aliphatic, alicyclic, aromatic or combinations thereof, e.g., aralkyl or alkaryl. Such hydrocarbyl groups may also contain aliphatic unsaturation, i.e., olefinic or acetylenic unsaturation, and may contain minor amounts of heteroatoms, such as oxygen or nitrogen, or halogens, such as chlorine.

The term "initiator" as used herein refers to the chemical moiety that starts the polymerization and satisfies the valence at the head of the polymer chain, or the molecule that provides that moiety. When a mono-functional initiator is used, the chain end (CE) concentration equals the initiator concentration. For a multi-functional initiator, when the functionality of the initiator equals x, then the chain end concentration equals x times initiator concentration.

The term "Lewis acid" as used herein refers to a compound that can accept a pair of electrons to form a covalent bond.

The term "living polymerization" as used herein refers to the polymerizations that proceed in the absence of measurable chain transfer and chain termination.

The term "quasi-living polymerization" as used herein refers to living polymerizations wherein reversible chain terminations is operable, but the rates of irreversible chain termination and chain transfer approach zero.

The term "quenching agent" as used herein refers to a chemical compound which is added to a polymerization reaction to react with the polymer chain end in the presence of an active Lewis acid. The quenching agent facilitates the removal of a proton from the reactive chain end.

The term "polyolefin" as used herein refers to a polymer produced by the addition polymerization of one or more olefins, such as ethylene, propylene, styrene, isobutylene, etc.

The term “protic impurity” as used herein refers to impurities within the polymerization reaction mixture that contain acidic hydrogen atoms in their structure, for example, water.

The term “regiospecific” as used herein refers to chemical reactions that give exclusively or nearly exclusively one of several possible isomeric products.

The term “termination” as used herein refers to the chemical reaction that terminates polymerization process or the quenching reaction by deactivation of the Lewis acid.

The term “terminator” as used herein refers to the chemical compound that terminates polymerization process or the quenching reaction, but may not simultaneously initiate a new polymer chain. A number of alcohols may be used as terminators.

The term “tert-chloride” refers to the 2-chloro-2-methylpropyl end group on a polyolefin polymer chain.

The term “vinylidene” refers to a polymer chain end with the following generic structure:

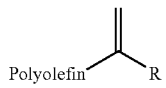

where R can be H, alkyl, aryl, aralkyl, or alkaryl.

The present invention is directed in part, to a method for producing an vinylidene terminated polymer comprising a) providing a quasiliving carbocationically terminated polyolefin polymer, and b) contacting the polymer in step a) with suitable substituted azole quenching agent. The quenching agents of the present invention are selected from substituted azoles containing one or more nitrogen atoms and an oxygen or sulfur heteroatom, wherein the substituent(s) are selected so that the substituted azole is able to facilitate in preparing a vinylidene terminated polymer from a quasiliving carbocationically terminated polyolefin. Substituent groups selected on the azole moiety add a degree of steric bulk around the nitrogen heteroatom and thus are selected so that the quencher will not quantitatively complex with the Lewis Acid at the prescribed reaction temperature, but the degree of steric bulk around the nitrogen heteroatom cannot be so great so as to prevent proton abstraction from the carbenium ion. Typically, suitable substituted azoles are substituted with one to three hydrocarbyl or substituted hydrocarbyl groups (defined herein) at each position readily available to receive substitution, thus for example, benzoxazole can have one additional heteroatom substituent since the fused ring already occupies two positions, however the fused aromatic ring can be further hydrocarbyl substituted, oxazole can have three substituents, and the like. Preferred substituted azole quenching agents contain one nitrogen atom and one oxygen atoms are selected from substituted oxazole, preferably 2, 4 substituted, more preferable 2, 4, 5 substituted; and substituted benzooxazole; while the substituted azole quenching agents containing one nitrogen atom and one sulfur atom are selected form substituted thiazole, preferably 2, 4 substitued and more preferably 2, 4, 5 substituted; and substituted benzothiazole.

The quenching agents of the present invention are capable of converting quasiliving carbocationically terminated polyolefin tert-chloride chain ends to the exo-olefin chain ends. Without being bound by any theory, for example, it is believed that for polyisobutylene, quenching agents of the present invention selectively catalyze the elimination of a proton from the gem-dimethyl carbon of the polyisobutylene chain end as shown below.

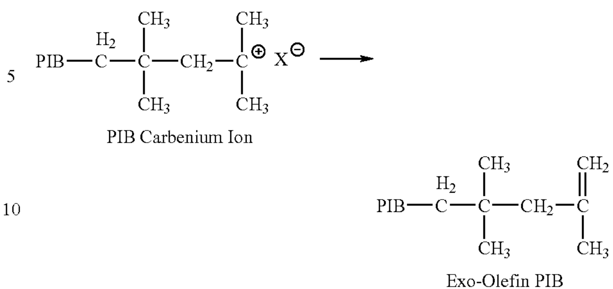

This result was unexpected since the quenching agents with very similar structures are known in the prior art to quench quasi-living cationic polymerizations by an electrophilic aromatic substitution (EAS) mechanism as disclosed in U.S. Pat. No. 6,969,744. Compounds which provide the highest EAS yields are typically substituted with electron donating groups located at strategic positions on the ring. It is believed that these substituents provide stabilization for the Friedel-Craft intermediates formed when, for example, polyisobutylene carbenium ions react with olefins in the ring.

The quenching agents used in the present invention can be employed to convert polyolefin polymer containing tert-halide chain ends to the exo-olefin chain ends independently of whether a mono-functional or a multi-functional is used. This rate of conversion is expected to be similar for mono-functional and di-functional initiators. Temperature dependence is observed for the preparation of the polyisobutylene polymers containing a high concentration of exo-olefin chain ends based on the total chain ends. It has been determined that raising the reaction temperature increases the yield of exo-olefin by suppressing coupling. Coupling is seen as a peak centered at 4.82 just up-field from the exo-olefin peak at 4.85 parts per million peak in the $^1$H NMR spectrum and also in the GPC spectrum, represented by a low elution volume shoulder on the main peak.

In one aspect, the conditions and systems for quasi-living polymerization conditions can be optimized in light of the subsequent quenching step. Without being bound by any theory, it is believed that the desired elimination reaction is in competition with the production of coupled product through reaction of the carbenium ion with already-formed exo-olefin. Therefore conditions that favor elimination and disfavor coupling are preferred. Higher reaction temperature has been found to favor elimination and disfavor coupling. In quasi-living cationic polymerization of isobutylene, an equilibrium exists between active, carbenium ions and dormant, tert-chloride chain ends. When the temperature of the system is raised, this equilibrium increasingly favors the dormant chain ends, but this should decrease the rates of elimination and coupling to an equal extent. However, higher temperature also should displace the equilibrium for the complex between quenching agent and Lewis acid toward un-complexed quenching agent, which is believed to be the agent that causes elimination. Raising the temperature thus provides a competitive advantage to the desired reaction. Temperature cannot be increased without limit. In fact, for certain quenching agents, the enthalpy of the quenching agent-Lewis acid complexation equilibrium is so strongly negative in the forward direction, that the quencher is only effective at higher temperatures and totally ineffective at lower temperatures. Thus, in general, the quenching process is beneficially carried out at higher temperatures; although, temperature cannot be increased without limit.

Chain-end concentration and its relationship to quenching agent concentration and Lewis acid concentration are important variables. Higher chain-end concentrations, which become necessary when low molecular weights are targeted, preferentially favor olefin coupling since that process is second order in polymer chains. Therefore, to maintain the desired dominance of the rate of elimination, quenching agent concentration and/or temperature should be increased. Both of these changes, however, have the undesirable effect of reducing the concentration of carbenium ions and thus retarding the conversion of chain ends to exo-olefin. Increasing quenching agent concentration diminishes the concentration of Lewis acid possibly through the formation of a complex between quenching agent and Lewis acid, and this would diminish the carbenium ion concentration since the latter varies approximately with the square of the Lewis acid concentration. Therefore, recipes targeting low molecular weight should be formulated with higher quenching agent concentrations and higher Lewis acid concentrations and preferably run at higher temperatures. An expedient way to reduce coupling at any target molecular weight is to dilute all reactants with additional diluent.

It has been found that in the presence of sufficient concentrations of a basic electron donor, improved conversions to exo-olefin chain ends can be attained when the quenching agent concentration is but a fraction of the quasi-living chain end concentration. This suggests that under these conditions, the quenching agent may remove a proton from the carbenium ion and subsequently transfers the proton to the electron donor. That is, the quenching agent may act as a catalyst for elimination, and the electron donor may serve as a proton acceptor. The use of a less-than-stoichiometric concentration (relative to chain ends) of quenching agent could confer economic advantages in practicing the method the present invention. On the other hand, in the absence of a basic electron donor, for example, when the latter is replaced by a common ion salt or its precursor, it has been found that complete conversion of the chain ends to exo-olefin requires a stoichiometric or higher concentration of quenching agent. Under these conditions the quenching agent may serve as both catalyst and proton acceptor.

General Procedure for Preparation of Polyolefin Polymers Containing Exo-olefin End Groups on the Chain A typical procedure for the preparation of polyolefin polymers of the present invention is given below. The method of the present invention may be conducted as a batch process, a continuous process, a semi-batch process or by any process known by persons skilled in the art. The polymerization reaction is typically carried out under inert gas and in a substantially anhydrous environment.

The reactor is charged with the following reactants:

1. a diluent,
2. an initiator,
3. an electron donor or common ion salt, or its precursor,
4. one or more monomers, and
5. a Lewis acid, which typically comprises a halide of titanium or boron;

The reaction mixture is equilibrated at the desired temperature, ranging from about −130° C. to about 10° C. The method of the present invention may be carried out at any desired pressure, atmospheric, sub-atmospheric or super-atmospheric pressure. The progress of the polymerization reaction is monitored in situ by determination of the amount of monomer remaining in the reaction mixture. After high conversion of the monomer is observed, an aliquot is removed for determination of the pre-quench chain end composition before addition of the quenching agent. The polymerization reaction in the aliquot is terminated with an appropriate alcohol equilibrated at the desired temperature.

6. One or more nitrogen azole quenching agents is added to the reaction mixture to quench the polymerization reaction.

Although, the concentration of the reactants may be varied to obtain the desired product, it has been found that certain ratios of the reactants are preferred for obtaining high exo-olefin chain end yield. The ratios are described below:

The molar ratio of monomer to initiator is in the range from about 3:1 to about 20,000:1. Preferably the molar ratio of monomer to initiator is in the range of about 5:1 to about 2,000:1. More preferably the molar ratio of monomer to initiator is about 10:1 to 150:1. The mole ratio of monomer to initiator controls the final molecular weight of the polyolefin.

The molar ratio of Lewis acid to chain ends is in the range from about 0.1:1 to about 2,500:1. Preferably the molar ratio of Lewis acid to chain ends is in the range of about 2:1 to about 200:1. More preferably the molar ratio of Lewis acid to chain ends is about 2:1 to 15:1.

The molar ratio of Lewis acid to electron donor is in the range from about 1.1:1 to about 10,000:1. Preferably the molar ratio of Lewis acid to electron donor is in the range of about 2:1 to about 100:1. More preferably the molar ratio of Lewis acid to electron donor is about 4:1 to 30:1.

The molar ratio of Lewis acid to quenching agent is in the range from about 1.1:1 to about 2,500:1. Preferably the molar ratio of Lewis acid to quenching agent is in the range of about 2:1 to about 100:1. More preferably the molar ratio of Lewis acid to quenching agent is about 2:1 to 15:1.

The molar ratio of quenching agent to chain ends is in the range from about 0.25:1 to about 20:1. Preferably the molar ratio of quenching agent to chain end is in the range of about 0.5:1 to about 5:1. More preferably the molar ratio of quenching agent to chain end is about 0.5:1 to 4:1.

Additional aliquots may be removed from the reaction mixture at various time intervals after addition of the quenching agent to determine the concentration of the exo-olefin chain ends on the polyolefin polymers. The polymerization reaction is terminated in all the aliquot samples and the remaining reaction mixture with an appropriate alcohol equilibrated at the desired temperature.

The concentration of the exo-olefin chain ends, along with the concentration of the endo-olefin and tert-chloride chain ends, is quantified using $^{1}H$ NMR. GPC spectra are also obtained to qualitatively determine the amount of the EAS product, the di-EAS product and the coupled product.

The quasiliving polymerization and/or contacting with the quenching agent reaction(s) may be conducted batchwise or as a semicontinuous or continuous operation in which continuous streams of ingredients are delivered to the reactor; appropriate reactor systems include but are not limited to continuously stirred tank reactor systems, wherein an overflow of a slurry or solution of polymer is taken out for the recovery of the polymer therefrom, or plug flow reactors. Preferably, the reactor contents are stirred or agitated to achieve an even reactant distribution therein. Heterogeneous quenching agents can be effectively contacted with the quasiliving polymer using fixed bed and slurry reactors where the quenching agent is prepared as dispersion or in a fixed medium. The preferred mode of reaction is a batch process although theoretically a plug flow reactor may have process advantages. Typically, the reaction(s) are conducted in the liquid phase for ease of handling and to induce linear or chain type polymerization in contradistinction to ring or branch formation. If a feed is used which is gaseous under ambient conditions, it is preferred to control the reaction pressure and/or dissolve the feed in an inert solvent or liquid diluent, in order to maintain the feed in the liquid phase. For butane feeds, typical $C_4$ cuts comprising the feed are liquid under pressure and/or low temperatures and do not need a solvent or diluent. The temperature at which the reactions are carried out is important; depending upon the living or quasiliving system, too high a reaction temperature can diminish or eliminate the living character of the cationic polymerization.

Compounds suitable for use in the preparation of the polyolefin polymers of the present invention are given below:

Diluents

Diluents influence the ionization equilibrium and rates of exchange of growing species through their polarity, which can be estimated from their dielectric constants. Typically, solvents having low dielectric constants are preferred since ion pairs are less dissociated. Suitable solvents include, but are not limited to, low-boiling alkanes and alkyl mono or polyhalides with reasonably low freezing points to be used at the preferred polymerization temperature. Illustrative solvents include alkanes (generally $C_2$ to $C_{10}$ alkanes, including normal alkanes such as propane, normal butane, normal pentane, normal hexane, normal heptane, normal octane, normal nonane and normal decane, and branched alkanes including isobutane, isopentane, neopentane, isohexane, 3-methylpentane, 2,2-dimethylbutane, 2,3-dimethylbutane and the like), halogenated alkanes such as chloroform, ethylchloride, n-butyl chloride, methylene chloride, methyl chloride, 1,2-dichloroethane, 1,1,2,2-tetrachloroethane, carbon tetrachloride, 1,1-dichloroethane, n-propyl chloride, iso-propyl chloride, 1,2-dichloropropane, or 1,3-dichloropropane,alkenes and halogenated alkenes (such as vinyl chloride, 1,1-dichloroethene, and 1,2-dichloroethene), carbon disulfide, sulfur dioxide, acetic anhydride, acetonitrile, benzene, toluene, methylcyclohexane, chlorobenzene, nitro-alkanes (such as nitropropane) to name a few of the representative liquid diluents or solvents useful in cationic polymerizations. Mixed solvents (for example combinations of those listed above) can also be used.

Initiators

Initiator compounds for living and quasi-living carbocationic polymerization are well known in the art. Initiators may be mono-functional or multi-functional depending on the desired product. Mono-functional and di-functional initiators are employed when the desired polymer is to be linear. For making star polymers the initiator should have more than two reactive moieties. The contemplated initiator compounds can be represented by the general formula $(X'—CR_aR_b)_nR_c$ wherein $R_a$, $R_b$ and $R_c$ are independently comprises at least one of alkyl, aromatic, alkyl aromatic groups, and can be the same or different, and X' is an acetate, etherate, hydroxyl group, or a halogen. $R_c$ has a valence of n, and n is an integer of one to 4. Preferably $R_a$, $R_b$ and $R_c$ are hydrocarbon groups containing one carbon atom to about 20 carbon atoms, preferably one carbon atom to about 8 carbon atoms atoms. Preferably X' is a halogen and more preferably chloride. In some instances it is preferable to select the structure of $R_a$, $R_b$ and $R_c$ to mimic the growing species or monomer, e.g. a 1-phenylethyl derivative for polystyrene or 2,4,4-trimethyl pentyl derivative for polyisobutylene. Suitable compounds, include for example, cumyl, dicumyl and tricumyl halides, particularly the chlorides, i.e., 2-chloro-2-phenylpropane, i.e., cumyl chloride; 1,4-di(2-chloro-2-propyl)benzene, i.e., di(cumylchloride); 1,3,5-tri(2-chloro-2-propyl)benzene, i.e., tri(cumylchloride); 2,4,4-trimethyl-2-chloropentane; 2-acetyl-2-phenylpropane, i.e., cumyl acetate; 2-propionyl-2-phenyl propane, i.e., cumyl propionate; 2-methoxy-2-phenylpropane, i.e., cumylmethyl ether; 1,4-di(2-methoxy-2-propyl)benzene, i.e., di(cumylmethyl ether); 1,3,5-tri(2-methoxy-2-propyl)benzene, i.e., tri(cumylmethyl ether), and similar compounds. Other suitable examples can be found in U.S. Pat. No. 4,946,899. Particularly preferred examples are 2-chloro-2,4,4-trimethyl pentane (TMPCl), 1,3-di(2-chloro-2-propyl)benzene, 1,3,5 tri(2-chloro-2-propyl)benzene, and 1,3,-di(2-chloro-2-propyl)-5-tert-butylbenzene (bDCC).

The concentration of the chain ends in the total reaction mixture may be in the range from about 0.0001 moles per liter to about 2.0 moles per liter. Preferably the concentration of the chain ends is in the range from about 0.001 moles per liter to about 1.0 moles per liter. More preferably the concentration of the chain ends is in the range from about 0.005 moles per liter to about 0.5 moles per liter.

Electron Donors

Electron donors have been shown to convert traditional polymerization systems into living and/or quasi-living cationic polymerizations systems. The electron donor used in the present invention is not specifically limited to any particular compound or class of compounds. Examples include pyridines and alkyl amines, aprotic amides, sulfoxides, esters, metal compounds having an oxygen atom bonded to a metal atom, and others. Pyridine compounds include 2,6-di-tert-butylpyridine, 2,6-dimethylpyridine, 2,4-dimethylpryidine, 2,4,6-trimethylpyridine, 2-methylpyridine and pyridine. N,N-dimethylaniline and N,N-dimethyltoluidine may be also employed. Amide compounds include N,N-dimethylformamide, N,N-dimethylacetamide and N,N-diethylacetamide. An example of a sulfoxide compound is dimethyl sulfoxide. Diethyl ether is an example of an ether compound, and methyl acetate and ethyl acetate are examples of ester compounds. Phosphate compounds such as trimethyl phosphate, tributyl phosphate, triamide hexamethylphosphate may also be employed. Oxygen-containing metal compounds such as tetraisopropyl titanate are also useful as electron donors.

The concentration of the electron donors in the total reaction mixture may be in the range from about 0.001 moles per liter to about 0.1 moles per liter. Preferably the concentration of the electron donors is in the range from about 0.001 moles per liter to about 0.05 moles per liter. More preferably the concentration of the electron donors is in the range from about 0.002 moles per liter to about 0.02 moles per liter.

Common Ion Salts and Common Ion Salt Precursors

Common ion salts or salt precursors may be optionally added to the reaction mixture in addition to or replacement of the electron donor. Typically, these salts are used to increase the ionic strength, suppress free ions, and beneficially interact with ligand exchange. Particularly preferred are common ion salt precursors, for example tetra-n-butylammonium chloride ($n\text{-}Bu_4NCl$). The concentration of the common ion salts or salt precursors in the total reaction mixture may be in the range from about 0.0005 moles per liter to about 0.05 moles per liter. Preferably the concentration of the common ion salts or salt precursors is in the range from about 0.0005 moles per liter to about 0.025 moles per liter. More preferably the concentration of the common ion salt or salt precursors is in the range from about 0.001 moles per liter to about 0.007 moles per liter.

Monomers

Suitable monomers for use in the method of the present invention are hydrocarbon monomers, i.e., compounds containing only hydrogen and carbon atoms, especially olefins and diolefins, and normally those having from about 2 to about 20, but preferably from about 4 to about 8 carbon atoms. The process can be employed for the polymerization of such monomers to produce polymers of different, but uniform molecular weights, for example, from about 300 to in excess of a million g/mol. Such polymers can be low molecular weight liquid or viscous polymers having a molecular weight of from about 200 to 10,000 g/mol, or solid waxy to plastic, or elastomeric materials having molecular weights of from about a 100,000 to 1,000,000 g/mol, or more. Suitable monomers include such compounds as isobutylene, styrene, beta pinene, isoprene, butadiene, substituted compounds of the preceding types, and others. Particularly preferred monomers are isobutylene, 2-methyl-butene, 3-methyl-1-butene, 4-methyl-1-pentene, and beta-pinene. An even more preferred monomer is isobutylene. Mixtures of monomers may be used. The concentration of the monomers in the total reaction mixture may be in the range from about 0.01 moles per liter to about 5.0 moles per liter. Preferably the concentration of the monomers is in the range from about 0.1 moles per liter to about 2.0 moles per liter. More preferably the concentration of the monomers is in the range from about 0.3 moles per liter to about 1.0 moles per liter. Most preferably the concentration of the monomers is 0.5 moles per liter.

Lewis Acids

Lewis acids that are suitable as catalysts for purposes of the invention include, but are not limited to, titanium and boron halides, particularly titanium tetrachloride and boron trichloride. Use of the titanium halides and particularly titanium tetrachloride is preferred. The strength of the Lewis acid and its concentration should be adjusted for the particular monomer. Additionally, the strength of these Lewis acids can be adjusted using nucleophilic additives. In some instances these Lewis acids are also referred to as co-initiators. The amount of the Lewis acid present in the initiator system may vary. However, it is desirable that the concentration of Lewis acid is sufficient to achieve an appropriate rate of polymerization and quenching. The Lewis acid concentration should not be so high as to precipitate the formed polymer. The concentration of the Lewis acid in the total reaction mixture may be in the range from about 0.001 moles per liter to about 3.0 moles per liter. Preferably the concentration of the Lewis acid is in the range from about 0.005 moles per liter to about 1.5 moles per liter. More preferably the concentration of the Lewis acid is in the range from about 0.05 moles per liter to about 1.0 mole per liter.

Quenching Agents

Quenching agents contemplated for use in preparation of the polyolefin in the present invention are described herein below. The quenching agents of the present invention are selected from substituted azoles containing a nitrogen atom and an oxygen or sulfur heteroatom, wherein the substituent(s) are selected so that the substituted azole is able to facilitate in preparing a vinylidene terminated polymer from a quasiliving carbocationically terminated polyolefin. Particularly preferred azoles containing one nitrogen atom and at least one oxygen or sulfur heteroatom are substituted at the 2, 4 and the 2, 4, 5 position.

The substituted azole may be substituted with from one to three hydrocarbyl or substituted hydrocarbyl groups wherein the term "hydrocarbyl" as used herein describe organic compounds or radicals consisting exclusively of the elements carbon and hydrogen. Furthermore, fused ring azoles of the present invention may optionally be substituted with up to four hydrocarbyl or substituted hydrocarbyl groups. These hydrocarbyl moieties include alkyl, alkenyl, alkynyl, and aryl moieties. These moieties also include alkyl, alkenyl, alkynyl, and aryl moieties substituted with other aliphatic or cyclic hydrocarbon groups, such as alkaryl, alkenaryl and alkynaryl. Unless otherwise indicated, these moieties preferably comprise 1 to 20 carbon atoms. The "substituted hydrocarbyl" moieties described herein are hydrocarbyl moieties which are substituted with at least one atom other than carbon, including moieties in which a carbon chain atom is substituted with a heteroatom such as nitrogen, oxygen, silicon, phosphorus, boron, sulfur, or a halogen atom. Exemplary substituted hydrocarbyl moieties include, alkoxyalkyl, alkenyloxyalkyl, alkynyloxyalkyl, aryloxyalkyl, protected hydroxyalkyl, keto, acyl, protected aminoalkyl, alkylalkylthio, arylalkylthio, ketals, acetals, amides, esters and the like. Preferably the substituted azole is fully substituted meaning that the available positions on the heterocycle ring are substituted with hydrocarbyl or substituted hydrocarbyl groups.

The substituted azole quenching agents containing one nitrogen atom and one oxygen atoms are selected from substituted oxazole, preferably 2, 4, 5 substituted; and substituted benzooxazole. The substituted azole quenching agents containing one nitrogen atom and one sulfur atom are selected form substituted thiazole, preferably 2, 4, 5 substituted; and substituted benzothiazole.

Particularly preferred quenching agents are represented according to the compounds of Formula I:

Formula I

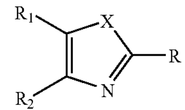

wherein:

$R_1$ and $R_2$ are independently hydrogen, alkyl from 1 to 20 carbon atoms, cycloalkyl from about 3 to about 7 carbon atoms, aryl from 6 to about 20 carbon atoms, alkaryl from about 7 to 30 carbon atoms, aralkyl from about 7 to 30 atoms; or $R_1$ and $R_2$ together form a fused aromatic ring having from 6 to 10 carbon atoms which may be unsubstituted or substituted with 1 to 4 substituents selected independently from alkyl of one carbon atom to about 20 carbon atoms, cycloalkyl of about 3 to about 7 carbon atoms, aryl of about 6 to about 30 carbon atoms, alkaryl of about 7 to about 30 carbon atoms, aralkyl of about 7 to about 30 carbon atoms, alkoxy of about 1 to 6 carbon atoms, alkylthioether of about 1 to 6 carbon atoms, halo, or amino of the formula—NR*R**, where R* and R** are independently alkyl from about 4 to 10 carbon atoms, cycloalkyl of about 4 to about 7 carbon atoms, aryl of about 6 to about 10 carbon atoms, alkaryl of about 7 to about 10 carbon atoms, aralkyl of about 7 to about 10 carbon atoms;

R is hydrogen, alkyl from 1 to 20 carbon atoms, cycloalkyl from about 3 to 7 carbon atoms, aryl from 6 to about 20 carbon atoms, alkaryl from about 7 to 30 carbon atoms, aralkyl from about 7 to 30 atoms, with the proviso that when R is hydrogen, than $R_2$ is branched alkyl having at least three carbon atoms, aryl, cycloalkyl, alkaryl, or aralkyl, and with the further proviso that when R is methyl then $R_1$ and $R_2$ are independently selected from alkyl from 1 to 20 carbon atoms, cycloalkyl from about 3 to about 7 carbon atoms, aryl from 6 to about 20 carbon atoms, alkaryl from about 7 to 30 carbon atoms, aralkyl from about 7 to 30 atoms; and X is oxygen or sulfur.

In another aspect, $R_1$ and $R_2$ are independently alkyl from 1 to 20 carbon atoms, cycloalkyl from about 3 to about 7 carbon atoms, aryl from 6 to about 20 carbon atoms, alkaryl from about 7 to 30 carbon atoms, aralkyl from about 7 to 30 atoms; or $R_1$ and $R_2$ together form a fused aromatic ring having from 6 to 10 carbon atoms which may be unsubstituted or substituted with 1 to 4 substituents selected independently from alkyl of one carbon atom to about 10 carbon atoms, cycloalkyl of about 3 to about 7 carbon atoms, aryl of about 6 to about 10 carbon atoms, alkaryl of about 7 to about 10 carbon atoms, aralkyl of about 7 to about 10 carbon atoms, alkoxy of about 1 to 6 carbon atoms, alkylthioether of about 1 to 6 carbon atoms, halo, or amino of the formula —NR*R**, where R* and R** are independently alkyl from about 4 to 10 carbon atoms, cycloalkyl of about 4 to about 7 carbon atoms, aryl of about 6 to about 10 carbon atoms, alkaryl of about 7 to about 10 carbon atoms, aralkyl of about 7 to about 10 carbon atoms;

R is alkyl from 2 to 20 carbon atoms, cycloalkyl from about 3 to 7 carbon atoms, aryl from 6 to about 20 carbon atoms, alkaryl from about 7 to 30 carbon atoms, aralkyl from about 7 to 30 atoms; and X is oxygen or sulfur.

In another aspect, $R_1$ and $R_2$ are independently alkyl from 1 to 20 carbon atoms, aryl from 6 to about 20 carbon atoms, alkaryl from about 7 to 30 carbon atoms, aralkyl from about 7 to 30 atoms; or $R_1$ and $R_2$ together form a fused aromatic ring having from 6 to 10 carbon atoms; R is alkyl from 2 to 20 carbon atoms, aryl from 6 to about 20 carbon atoms, alkaryl from about 7 to 30 carbon atoms, aralkyl from about 7 to 30 atoms; and X is oxygen or sulfur.

In another aspect of the present invention the $R_1$, $R_2$ and R are independently alkyl from 3 to 18 carbon atoms and more preferably 4 to 12 carbon atoms. Particularly preferred quenching agents of formula I are the substituted benzoxazole and substituted benzothiazole of formula II Formula II

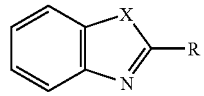

wherein:

R is alkyl from 2 to 20 carbon atoms, more preferably 3 to 18 carbon atoms, aryl from 6 to about 20 carbon atoms, alkaryl from about 7 to 30 carbon atoms, aralkyl from about 7 to 30 atoms; and X is oxygen or sulfur.

EXAMPLES

The invention is further illustrated by the following examples, which are not to be considered as limitative of its scope. Wherein unless expressly stated in the contrary, all temperatures and temperatures ranges refer to the Centigrade system and the term "ambient" or "room temperature" refers to about 20 to 25 C. The term "percent or %" refers to weight percent.

Example 1

Preparation of Polyisobutylene Using a Mono-functional Initiator and 2-phenylbenzoxazole A four-neck 250 milliliter round-bottom flask was equipped with an overhead mechanical stirrer and platinum resistance thermometer. This assembly was immersed into a heptane bath at −60° C. under dry nitrogen gas in a substantially inert atmosphere glovebox. The flask was then charged with the following reactants:

108 milliliters hexane equilibrated at −60° C., 72 milliliters methylchloride equilibrated at −60° C., 0.48 milliliters 2-chloro-2,4,4-trimethylpentane equilibrated at room temperature, 0.23 milliliters 2,6-dimethylpyridine equilibrated at room temperature, and 16.4 milliliters of isobutylene equilibrated at −60° C.

Then, the contents of the round-bottom flask were equilibrated at −60° C.

With continued stirring, next 1.82 milliliters titanium tetrachloride was charged to the flask. The reaction was allowed to proceed 12 minutes and then 20 milliliters of the polymerization solution was charged to each of nine 60 milliliter test tubes, equipped with threaded caps, immersed in the heptane bath.

The polymerization was allowed to continue in each test tube for 12 additional minutes (24 total reaction minutes) at which point 1 of the 9 tubes was terminated with 5 milliliters of methanol to provide a comparative example prior to addition of 2-phenylbenzooxazole. 0.109 g of 2-phenylbenzoxazole (Aldrich Chemical Co.) was added to one of the remaining test tubes containing a reactive polymerization, while other quenching agents were added to 6 of the remaining test tubes. The 2-phenylbenzoxazole quenching reaction (and other quenching reactions) was allowed to proceed 30 minutes at which time 5 milliliters of methanol was charged in order to terminate the quenching reactions. The final polymerization test tube was then terminated with 5 milliliters of methanol to provide a final comparative example (Control A). Non-quencher-containing reactions were used to provide a comparative baseline for the quenching reactions and to provide references for structural and molecular weight characterization in the absence of a quenching agent.

Examples 2-5

Examples 2-5 were conducted according to the procedure described above in Example 1 except that other quenching agents were charged to the quasiliving polymerization instead of 2-phenylbenzoxazole. Additionally, examples 4 and 5 were conducted at −40° C.; Control B represents the final comparative baseline for the reactions conducted at −40° C. The reactant quantities for Examples 1-5 are listed in Table 1.

Comparative Examples A-J

Polybutene was prepared according to the procedure described in Example 1 above but, various quenching agents other than 2-phenylbenzoxazole were utilized. The comparative examples represent cyclic, aromatic quenching agents containing both nitrogen and another heteroatom within the ring which did not yield more vinylidene PIB than Control A at −60° C. or Control B at −40° C.

The reactant quantities for comparative examples A-J are listed in Table 1.

TABLE I

| Example | Initiator | Initiator (g) | 2,6-Dimethyl pyridine (g) | Isobutylene (g) | $TiCl_4$ (g) | Quenching Agent | Quenching Agent (g) | Total Reaction Volume (L) | Total Diluent Volume (L) | Temp. (° C.) |
|---|---|---|---|---|---|---|---|---|---|---|
| 1 | TMPCl | 0.0416 | 0.0214 | 1.1222 | 0.3149 | 2-phenylbenzoxazole | 0.109 | 0.020 | 0.018 | −60 |
| 2 | TMPCl | 0.0416 | 0.0214 | 1.1222 | 0.3149 | 2-phenylbenzothiazole | 0.118 | 0.020 | 0.018 | −60 |
| 3 | TMPCl | 0.0416 | 0.0214 | 1.1222 | 0.3149 | 2,4,5-trimethyloxazole | 0.064 | 0.020 | 0.018 | −60 |
| 4 | TMPCl | 0.0416 | 0.0214 | 1.1222 | 0.3149 | 2,5-diphenyloxazole | 0.128 | 0.020 | 0.018 | −40 |
| 5 | TMPCl | 0.0416 | 0.0214 | 1.1222 | 0.3149 | 2-ethyl-4-methylthiazole | 0.074 | 0.020 | 0.018 | −40 |
| A | TMPCl | 0.0416 | 0.0214 | 1.1222 | 0.3149 | Benzoxazole | 0.069 | 0.020 | 0.018 | −60 |
| B | TMPCl | 0.0416 | 0.0214 | 1.1222 | 0.3149 | Thiazole | 0.049 | 0.020 | 0.018 | −60 |
| C | TMPCl | 0.0416 | 0.0214 | 1.1222 | 0.3149 | 2,4-dimethylthiazole | 0.065 | 0.020 | 0.018 | −60 |
| D | TMPCl | 0.0416 | 0.0214 | 1.1222 | 0.3149 | 4-methylthiazole | 0.057 | 0.020 | 0.018 | −60 |
| E | TMPCl | 0.0416 | 0.0214 | 1.1222 | 0.3149 | Anthranil | 0.067 | 0.020 | 0.018 | −60 |
| F | TMPCl | 0.0416 | 0.0214 | 1.1222 | 0.3149 | 2-methylbenzoxazole | 0.077 | 0.020 | 0.018 | −60 |
| G | TMPCl | 0.0416 | 0.0214 | 1.1222 | 0.3149 | Benzothiazole | 0.078 | 0.020 | 0.018 | −60 |
| H | TMPCl | 0.0416 | 0.0214 | 1.1222 | 0.3149 | 2,5-diphenyloxazole | 0.128 | 0.020 | 0.018 | −60 |
| I | TMPCl | 0.0416 | 0.0214 | 1.1222 | 0.3149 | 2-ethyl-4-methylthiazole | 0.074 | 0.020 | 0.018 | −60 |
| J | TMPCl | 0.0416 | 0.0214 | 1.1222 | 0.3149 | oxazole | 0.040 | 0.020 | 0.018 | −60 |
| Control A | TMPCl | 0.0416 | 0.0214 | 1.1222 | 0.3149 | None | 0 | 0.020 | 0.018 | −60 |
| Control B | TMPCl | 0.0416 | 0.0214 | 1.1222 | 0.3149 | None | 0 | 0.020 | 0.018 | −40 |

Procedure for Collecting $^1$H NMR Data $^1$H NMR spectra were collected using a Varian (300 MHz) spectrophotometer using samples concentrations of 3 percent to 5 percent (weight/weight) in $CDCl_3$. $^1$H NMR spectra were used for analysis of the end groups. Fractions of exo-olefin, endo-olefin, tert-chloride and coupled olefin chain ends were obtained using $^1$H NMR integration as described in a subsequent section.

Procedure for Collecting GPC Data

GPC data were used to determine number average molecular weight ($M_n$), weight average molecular weight ($M_w$) and Polydispersity index (PDI), i.e., $M_w/M_n$. GPC was also used to qualitatively detect olefin coupled product.

Procedure for Calculating the Fractional Amounts of Chain Ends on the Polyisobutylene Product The fractions of exo-olefin, endo-olefin, and tert-chloride chain ends, and coupled products in the polyisobutylene samples were quantified using $^1$H NMR integration. It was assumed that these four species represent 100 percent of the chain ends. In some instances coupled products were deemed to be absent by qualitative inspection of the $^1$H NMR spectrum, and by confirming the absence of a shoulder on the low elution volume side of the main polymer peak in the GPC chromatogram. Two procedures are given below. The "General Procedure" was used when coupled product was detected; the "Special Procedure" was used when coupled product was deemed to be absent.

General Procedure

The fractional molar amount of each type of chain end was obtained using an equation analogous to the equation given below for determining the fractional amount of exo-olefin, $$F(\text{exo})=(A_{exo})/(A_{exo}+A_{endo}+A_{tert\text{-}Cl}+2A_{coupled}) \quad (1)$$

where $A_{endo}$ is the area of the single olefinic resonance at 5.15 ppm, $A_{exo}$ is the area of the exo-olefinic resonance 4.63 ppm, and $A_{tert\text{-}Cl}$ was calculated as follows:

$$A_{tert\text{-}Cl}=(A_{1.65\text{-}1.72}/6)-A_{endo} \quad (2)$$

where $A_{1.65\text{-}1.72}$ is the integrated area of the convoluted peaks associated with the gem-dimethyl protons of the endo-olefin and the tert-chloride chain ends. It will be noted that a coefficient of 2 appears in equation (1) for coupled product, to account for the fact that creation of these products consumes 2 polyisobutylene chains. $A_{coupled}$ was calculated as follows:

$$A_{coupled}=(A_{5.0\text{-}4.75}-A_{4.5\text{-}4.75})/2 \quad (3)$$

where $A_{5.0\text{-}4.75}$ is the integrated area of the convoluted peaks associated with one of the exo-olefin protons and the two identical protons of the coupled product, and where $A_{4.5\text{-}4.75}$ is the integrated area of the peak associated with the other exo-olefin proton.

Special Procedure

In the qualitative absence of coupled product, the fractional molar amount of each type of chain end was obtained using an equation analogous to the equation given below for determining the fractional amount of exo-olefin, $$F(\text{exo})=(A_{exo})/(A_{exo}+A_{endo}+A_{tert\text{-}Cl}) \quad (1)$$

where $A_{endo}$ is the area of the single olefinic resonance at 5.15 ppm, $A_{exo}$ is the average area of the two exo-olefinic resonances at 4.63 and 4.85 parts per million, and $A_{tert\text{-}Cl}$ was calculated in the same manner as described in the "General Procedure".

The $^1$H NMR results obtained on the polyisobutylene samples prepared in Examples 1 and 2, and comparative examples A-J above are given below in Table II as the mole percent of the total end groups.

TABLE II

| Examples | Quenching Agent | Composition of Chain Ends after Quenching Reaction[a] Exo-Olefin Chain End (mole %) | Endo-Olefin Chain End (mole %) | Tert-Cl Chain End (mole %) | Coupled Product (mole %) | Reaction Temp. (° C.) |
|---|---|---|---|---|---|---|
| 1 | 2-phenylbenzoxazole | 84 | 2 | 2 | 12 | −60 |
| 2 | 2-phenylbenzothiazole | 84 | 2 | 2 | 12 | −60 |
| 3 | 2,4,5-trimethyloxazole | 18 | <2 | 79 | 2 | −60 |
| 4 | 2,5-diphenyloxazole | 43 | 11 | 39 | 8 | −40 |
| 5 | 2-ethyl-4-methylthiazole | 34 | 13 | 48 | 5 | −40 |
| A | Benzoxazole | 8 | <2 | 90 | <1 | −60 |
| B | Thiazole | 8 | <2 | 90 | <1 | −60 |
| C | 2,4-dimethylthiazole | 8 | <2 | 90 | <1 | −60 |
| D | 4-methylthiazole | 8 | <2 | 90 | <1 | −60 |
| E | Anthranil (Benzo[c]isooxazole) | 8 | <2 | 90 | <1 | −60 |
| F | 2-methylbenzoxazole | 8 | <2 | 90 | <1 | −60 |
| G | Benzothiazole | 8 | <2 | 90 | <1 | −60 |
| H | 2,5-diphenyloxazole | 8 | <2 | 90 | <1 | −60 |
| I | 2-ethyl-4-methylthiazole | 8 | <2 | 90 | <1 | −60 |
| J | oxazole | 8 | <2 | 90 | <1 | −60 |
| Control A | None | 8 | <2 | 90 | <1 | −60 |
| Control B | None | 26 | 10 | 62 | 2 | −40 |

[a]Reactions conducted at −60° C. were allowed to react 30 min and reactions conducted at −40° C. were allowed to react 45 min.

As illustrated in Table 2, the quasiliving carbocationically terminated polyolefin polymer is enriched in vinylidene end groups when such polyolefin polymer is contacted with a suitable aromatic quenching agent containing both N and O or S as depicted above in Examples 1-5. Comparative Examples A-J represent cyclic, aromatic quenching agents containing both nitrogen and another heteroatom within the ring which did not yield more vinylidene PIB than the control aliquots.

What is claimed is:

1. A method for producing a vinylidene terminated polymer comprising:

a. providing a quasiliving carbocationically terminated polyolefin polymer, b. contacting the polymer in step a) with a substituted azole quenching agent compound according to Formula I:

Formula I

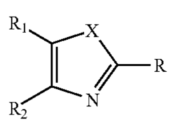

wherein:

$R_1$ and $R_2$ are independently alkyl from 1 to 20 carbon atoms, cycloalkyl from about 3 to about 7 carbon atoms, aryl from 6 to about 20 carbon atoms, alkaryl from about 7 to 30 carbon atoms, aralkyl from about 7 to 30 atoms; or $R_1$ and $R_2$ together form a fused aromatic ring having from 6 to 10 carbon atoms which may be unsubstituted or substituted with 1 to 4 substituents selected independently from alkyl of one carbon atom to about 10 carbon atoms, cycloalkyl of about 3 to about 7 carbon atoms, aryl of about 6 to about 10 carbon atoms, alkaryl of about 7 to about 10 carbon atoms, aralkyl of about 7 to about 10 carbon atoms, alkoxy of about 1 to 6 carbon atoms, alkylthioether of about 1 to 6 carbon atoms, halo, or amino of the formula —NR*R**, where R* and R** are independently alkyl from about 4 to 10 carbon atoms, cycloalkyl of about 4 to about 7 carbon atoms, aryl of about 6 to about 10 carbon atoms, alkaryl of about 7 to about 10 carbon atoms, aralkyl of about 7 to about 10 carbon atoms;

R is alkyl from 1 to 20 carbon atoms, cycloalkyl from about 3 to 7 carbon atoms, aryl from 6 to about 20 carbon atoms, alkaryl from about 7 to 30 carbon atoms, aralkyl from about 7 to 30 atoms, with the proviso that when R is methyl then $R_1$ and $R_2$ are independently selected from alkyl from 1 to 20 carbon atoms, cycloalkyl from about 3 to about 7 carbon atoms, aryl from 6 to about 20 carbon atoms, alkaryl from about 7 to 30 carbon atoms, aralkyl from about 7 to 30 atoms; and X is oxygen or sulfur.

2. The method of claim 1, wherein the quasiliving carbocationically terminated polymer is formed by contacting at least one cationically polymerizable olefin monomer with an initiator, in the presence of a Lewis acid and solvent under suitable quasiliving polymerization reaction conditions.

3. The method of claim 2, wherein the initiator is mono functional.

4. The method of claim 3, wherein the initiator is selected from the group consisting of 2-chloro-2-phenylpropane; 2-acetyl-2-phenylpropane; 2-propionyl-2-phenylpropane, 2-methoxy-2-phenylpropane, 2-ethoxy-2-phenylpropane, 2-chloro-2,4,4-trimethylpentane, 2-acetyl-2,4,4,-trimethylpentane, 2-propionyl-2,4,4-trimethylpentane, 2-methoxy-2,4,4-trimethylpentane, and 2-ethoxy-2,4,4-trimethylpentane.

5. The method of claim 3, wherein the initiator is 2-chloro-2,4,4-trimethylpentane.

6. The method of claim 2, wherein the initiator is bifunctional.

7. The method of claim 6, wherein the initiator is selected from the group consisting of 1,3-di(2-chloro-2-propyl)benzene, 1 ,3-di(2-methoxy-2-propyl)benzene, 1,4-di(2-chloro-2-propyl)benzene, 1,4-di(2-methoxy-2-propyl)benzene, and 5-tert-butyl- 1,3,-di(2-chloro-2-propyl) benzene.

8. The method of claim 7, wherein the initiator is 5-tert-butyl-1,3,-di(2-chloro-2-propyl) benzene.

9. The method of claim 2, wherein the initiator is multifunctional.

10. The method of claim 9, wherein the initiator is selected from the group consisting of 1,3,5-tri(2-chloro-2-propyl)benzene and 1,3,5-tri(2-methoxy-2-propyl)benzene.

11. The method of claim 2, wherein the at least one cationically polymerizable olefin monomer is selected from the group consisting of isobutene, 2-methyl-1-butene, 3-methyl-1-butene, and 4-methyl-1-pentene.

12. The method of claim 11, wherein the at least one cationically polymerizable olefin monomer is isobutylene.

13. The method of claim 2, wherein two different cationically polymerizable olefin monomers are employed.

14. The method of claim 2, wherein the Lewis acid is selected from the group consisting of titanium tetrahalide, boron trihalide, aluminum trichioride, tin tetrachioride, zinc chloride, and ethyl aluminum dichloride.

15. The method of claim 14, wherein the Lewis acid is selected from the group consisting of titanium tetrachloride, titanium tetrabromide, and boron trichioride.

16. The method of claim 15, wherein the Lewis acid is titanium tetrachloride.

17. The method of claim 2, wherein the quasiliving polymerization reaction conditions are selected to have a temperature range from between about −130° C. and +10° C.

18. The method of claim 17, wherein the quasiliving polymerization reaction conditions are selected to have a temperature range between −60° C. and −10° C.

19. The method of claim 18, wherein the quasiliving polymerization reaction conditions are selected to have a temperature range between −60° C. and −20° C.

20. The method of claim 1, wherein the quasiliving carbocationically terminated polyolefin polymer is formed by ionizing a polyolefin chain end in the presence of a Lewis acid and a solvent under suitable quasiliving polymerization reaction conditions.

21. The method of claim 20, wherein the quasiliving carbocationically terminated polyolefin polymer is formed by ionizing a polyolefin containing tert- halide chain ends in the presence of a Lewis acid and a solvent under suitable quasiliving polymerization reaction conditions.

22. The method of claim 20, wherein the quasiliving carbocationically terminated polyolefin polymer is formed by ionizing a polyolefin containing tert-chioride chain ends in the presence of a Lewis acid and a solvent under suitable quasiliving polymerization reaction conditions.

23. The method of claim 1 wherein $R_1$ and $R_2$ together form a fused aromatic ring having from 6 to 10 carbon atoms which is substituted with 1 to 4 substituents selected independently from alkyl of one carbon atom to about 10 carbon atoms, cycloalkyl of about 3 to about 7 carbon atoms, aryl of about 6 to about 10 carbon atoms, alkaryl of about 7 to about 10 carbon atoms, aralkyl of about 7 to about 10 carbon atoms.

24. The method of claim 1, wherein R is alkyl from 2 to 20 carbon atoms, cycloalkyl from about 3 to 7 carbon atoms, aryl from 6 to about 20 carbon atoms, alkaryl from about 7 to 30 carbon atoms, aralkyl from about 7 to 30 atoms.

25. The method of claim 1, wherein the contacting step is conducted under suitable reaction conditions to convert greater than 10 mole percent of the polymer in step a) to the vinylidene polymer product.

26. The method of claim 25, wherein the conversion is greater than 25 mole percent.

27. The method of claim 1, wherein the quenching agent in step b) is selected from the compound according to Formula I Formula I

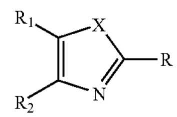

wherein:

$R_1$ and $R_2$ are independently alkyl from 1 to 20 carbon atoms, aryl from 6 to about 20 carbon atoms, alkaryl from about 7 to 30 carbon atoms, aralkyl from about 7 to 30 atoms; or $R_1$ and $R_2$ together form a fused aromatic ring having from 6 to 10 carbon atoms;

R is alkyl from 2 to 20 carbon atoms, aryl from 6 to about 20 carbon atoms, alkaryl from about 7 to 30 carbon atoms, aralkyl from about 7 to 30 atoms; and X is oxygen or sulfur.

28. The method of claim 27, wherein $R_1$ and $R_2$ are alkyl.

29. The method of claim 28, wherein X is oxygen.

30. The method of claim 28, wherein X is sulfur.

31. The method of claim 27, wherein the quenching agent in step b) is selected from the compound according to Formula II Formula II

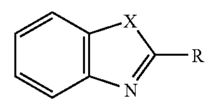

wherein

R is alkyl from 2 to 20 carbon atoms, aryl from 6 to about 20 carbon atoms, alkaryl from about 7 to 30 carbon atoms, or aralkyl from about 7 to 30 atoms; and X is oxygen or sulfur.

32. The method of claim 31, wherein R is aryl, alkaryl, or aralkyl.

33. The method of claim 32, wherein the quenching agent is either 2-phenylbenzoxazole or 2-phenylbenzothiazole.

34. The method of claim 26 wherein the conversion is from 75 to 90 mole percent.

* * * * *